United States Patent [19]
McClure

[11] 4,111,044
[45] Sep. 5, 1978

[54] FLOW MONITORING

[76] Inventor: Charles A. McClure, 5 Laurel Cir., Malvern, Pa. 19355

[21] Appl. No.: 749,276

[22] Filed: Dec. 10, 1976

[51] Int. Cl.² .............................................. G01F 1/20
[52] U.S. Cl. ...................................... 73/215; 73/302; 73/701; 73/714; 73/729
[58] Field of Search ................... 73/215, 302, 388 BN; 91/382

[56] References Cited

U.S. PATENT DOCUMENTS

| | | | |
|---|---|---|---|
| 1,015,556 | 1/1912 | Gibson | 73/215 |
| 1,268,130 | 6/1918 | Ledoux | 73/215 |
| 1,975,710 | 10/1934 | Borden | 73/215 |
| 1,977,498 | 10/1934 | Staegemann | 73/215 |
| 2,559,436 | 7/1951 | Isserstedt | 73/302 |
| 3,476,538 | 11/1969 | Tretheway | 73/302 X |
| 3,780,581 | 12/1973 | Acre et al. | 73/302 |
| 3,993,418 | 11/1976 | Simmons | 91/382 X |

*Primary Examiner*—Herbert Goldstein
*Attorney, Agent, or Firm*—Charles A. McClure

[57] ABSTRACT

Liquid flow in an open channel is monitored by sensing pressure of overlying liquid as depth thereof, transmitting changes in the sensed depth to means for characterizing depth as flow, and indicating the liquid flow so characterized. The pressure sensing and the transmittal of changes in sensed depth are accomplished pneumatically, via a bubbler tube and bellows plus self-balancing cam-and-valve means for controlling rotation of an air motor.

10 Claims, 7 Drawing Figures

FLOW MONITORING

This invention relates to monitoring of liquid flow in a channel open to the atmosphere—hence, an "open channel"—by means requiring no electrical power.

Many types of devices, usually electrically powered, are known for monitoring flow of liquid in an open channel. In potentially combustible atmospheres, such as are encountered from time to time in sewers, electrical apparatus usually contains an actual or potential spark source, which could bring about explosion and/or fire. Conventional non-electrical flow-monitoring apparatus often utilizes bubbler types of differential pressure apparatus but indicates only pressure or depth of liquid rather than its flow.

A primary object of the present invention is provision of a bubbler type of flow-monitoring with pneumatic energization.

Another object of this invention is pneumatically induced self-balancing of differential pressure flow-monitoring apparatus.

A further object of the invention is provision of apparatus functioning according to the foregoing objects.

Other objects of the present invention, together with means and methods for attaining the various objects, will be apparent from the following description and the accompanying diagrams of a preferred embodiment, which itself is presented by way of illustration rather than limitation.

In general, the objects of this invention are accomplished, in a method of monitoring flow in an open channel, by pneumatically sensing pressure of overlying liquid in the channel as depth of such liquid, transmitting changes in the sensed depth at the instance of pneumatic energization of means for doing so, characterizing depth as flow of liquid in the channel, and indicating such liquid flow.

More particularly, in apparatus for monitoring flow in a given open channel, including flow-indicating means having a movable indicator of flow amplitude, this invention comprises the combination of pneumatic means adjacent the bed of the channel for sensing liquid depth in terms of the pressure imposed by the overlying liquid, movable flow-characterizing means configured in accordance with a known relationship between liquid depth and flow in the given channel and interconnected to the flow indicator to move the same upon movement of the flow-characterizing means, movable pressure-responsive means interconnected to the sensing means to be repositioned upon occurrence of change in sensed pressure, and pneumatically actuated means for transmitting changes in position of the pressure-responsive means to the flow-characterizing means to move it accordingly.

Figure 1:
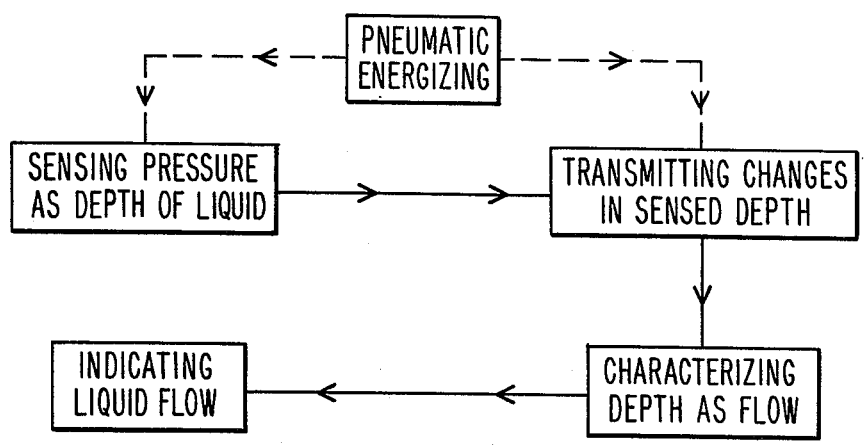
FIG. 1 is a block diagram of the method of this invention.

FIG. 1 shows generally the method of the present invention in schematic block form with solid arrows indicating sequence of steps and broken arrows indicating pneumatic energizing of the steps of sensing pressure as depth of liquid and transmitting changes in sensed depth. The next step is characterizing depth as flow, and the final step is indicating liquid flow.

Figure 2:
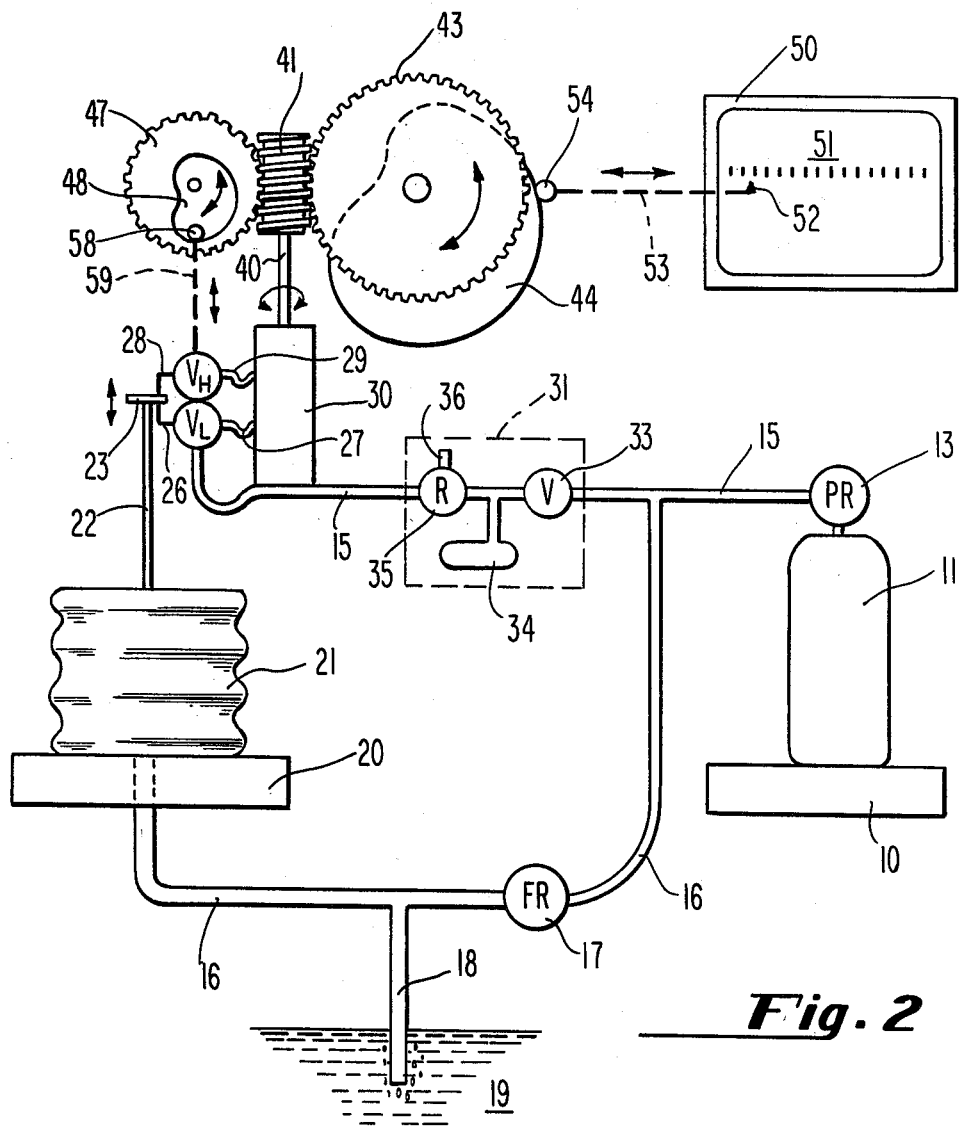
FIG. 2 is a largely schematic illustration of apparatus for practicing the method of the preceding view.

FIG. 2 shows, rather schematically, apparatus for practicing the method of this invention. Pressure container 11 on support 10 at the right connects to main supply line 15 for pneumatic fluid through pressure regulator 13. Branch pneumatic line 16 contains flow regulator 17 and interconnects to bubbler tube 18 immersed in liquid 19 in an open channel. Although the channel is not indicated in detail, it will be configured (as by inclusion of a weir or flume) or be calibrated to provide a known relationship of flow to depth. The branch line also leads to bellows 21 having bottom support 20. Extending from the opposite end of the bellows is rod 22 having position sensor 23 at its other end between lower and upper actuating arms 26 and 28 for (lowering) valve $V_L$ and (raising) valve $V_H$ connected to reversible airmotor 30 by flexible lines 27 and 29, respectively. Pneumatic energization is provided to the airmotor, via the valves, through main pneumatic supply line 15, shown connecting to valve $V_L$ after passing through intermittent means 31 shown in broken lines. The intermittent means comprises timing valve 33, pneumatic relay 35 and accumulator or ballast tank 34 connected to the supply line at the upstream side of the relay. The intermittent means may be omitted under certain circumstances as discussed below.

Shaft 40 of airmotor 30 has cylindrical drive screw 41, on its free end in engagement with gear 43 of flow-characterizing cam 44 at the right and with gear 47 of self-balancing cam 48 at the left. Follower 54 riding on the outer edge of cam 44 adjusts the position of arm 53 (broken lines) and pointer or pen 52 on scale on chart 51 of indicator/recorder 50. Follower 58 riding on the inner edge of cam 48 carries shaft 59 (broken lines) supporting valves $V_H$ and $V_L$.

Figure 3:
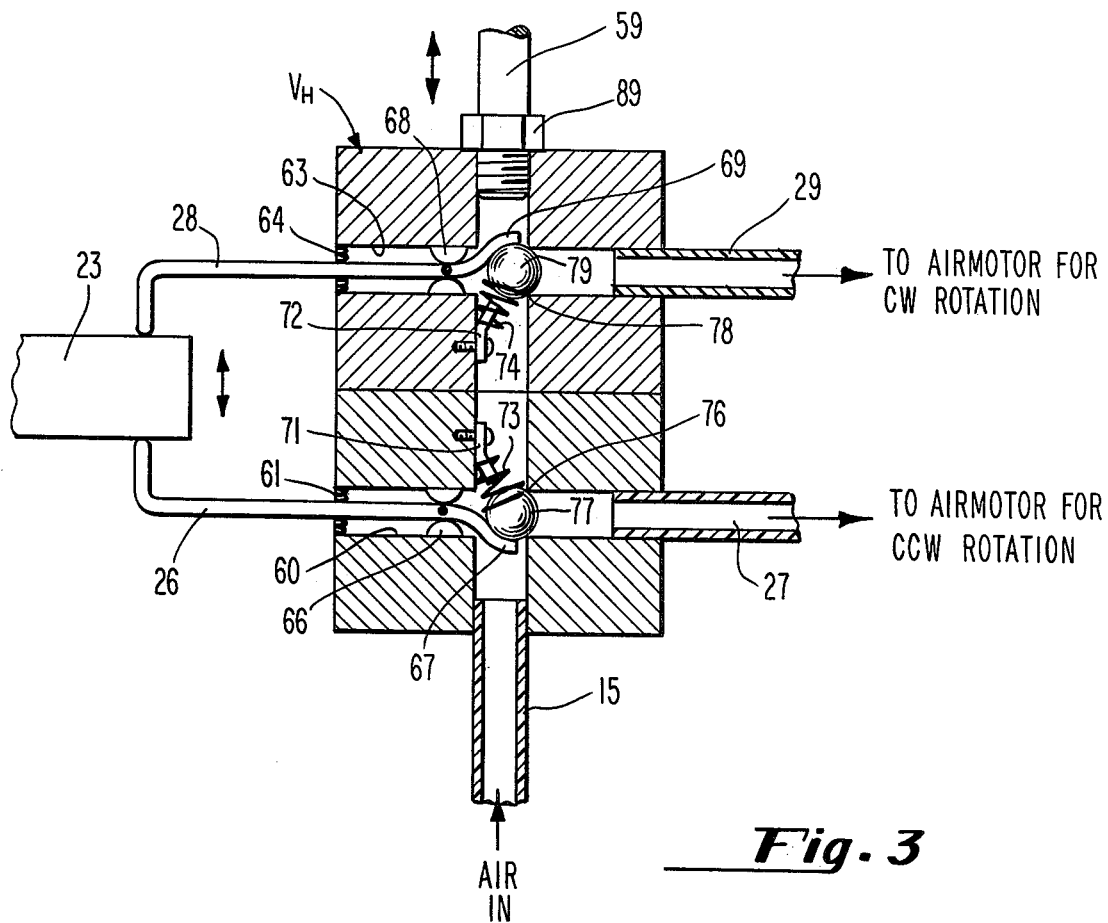
FIG. 3 is a sectional elevation of valve means shown more schematically in FIG. 2.

FIG. 3 shows the valve assembly in greater detail. Position sensor 23 is flanked above and below by actuating arms 28 and 26 pivoted in fittings 68 and 66, respectively, threaded into transverse bores 63 and 60 through respective valves $V_H$ and $V_L$. The bores are closed at the entering end by respective flexible seals 64 and 62. Opposite ends 69 and 67 of the respective actuating arms are curved upward and downward, respectively, to accommodate valve balls 79 and 77 shown resting against respective seats 78 and 76. The balls are biased toward their seats by helical springs 74 and 73, respectively, supported on oblique pins 72 and 71, each secured within vertical bore 80, which extends through both valve bodies. At the top the vertical bore receives and is sealed by valve-supporting shaft 59 threaded thereinto and secured by locknut 89. The lower end of the vertical bore receives main supply tube 15 (marked AIR IN). At the right, tubes 27 and 29, leaving respective horizontal bores 60 and 63, are broken away and are marked to indicate that they connect to the airmotor to produce, respectively, counterclockwise (CCW) and clockwise (CW) rotation thereof.

Figures 4A, 4B, 4C, 4D:
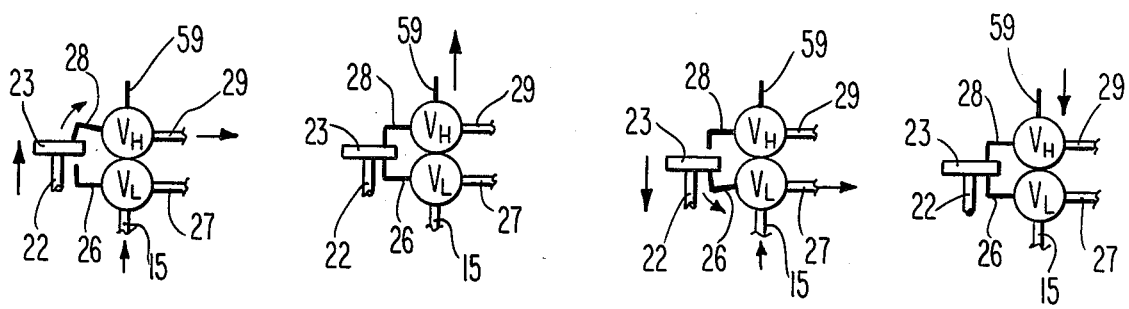
FIGS. 4A, B, C, and D are a sequence of views of the same valve means at various stages in self-balancing of the system embodied in the apparatus of the preceding views.

Operation of the illustrated apparatus to practice this invention is readily understood and is shown schematically in the sequence of views: FIGS. 4A through 4D. Upon an increase in surface level of liquid in the channel, back pressure upon the air or other pneumatic fluid in the bubble tube will increase, expanding the bellows and raising the position sensor 23. Upward displacement of the actuating arm 28 for valve $V_H$, as shown in FIG. 4A, unseats its ball 79 to release air to rotate the airmotor clockwise. Such rotation of the drive screw 41 rotates the indicator cam 44 counterclockwise, thereby providing an indication of correspondingly increased flow. Such rotation of the drive screw rotates the self-balancing cam 44 to raise the entire valve assembly until the upwardly displaced actuating arm returns to its original rest position, as shown in FIG. 4B, whereupon the ball 79 reseats and the airmotor stops as its supply of energizing fluid is cut off.

Upon a decrease in surface level of the liquid, a contrary sequence of events takes place. As shown in FIG. 4C, the actuating arm 26 for valve $V_L$ is deflected downward by downward displacement of the bellows position sensor 23. Unseating of the valve ball 77 enables the supplied fluid to rotate the airmotor in the opposite direction, reducing the scale indication and lowering the valve assembly until the deflected arm returns to its origianl rest position, as shown in FIG. 4D, whereupon the self-balancing action ceases. It will be understood that spring-biasing of the valve balls toward the seated position aids in returning the actuating arms to the neutral rest position.

Supply of actuating fluid to the valve assembly may be continuous or intermittent, as desired. Of course, in either event, no actuation of the indicating and self-balancing mechanism will ensue unless and until the liquid level changes. Continuous supply enables small significant changes in liquid depth to be transmitted to the indicating means as soon as they occur; each such change must be sufficient to open the appropriate valve against the bias provided by the spring and the fluid pressure seating the valve. Intermittent supply removes the fluid pressure as a deterrent to transmittal and thereby enables smaller changes to be transmitted, though only at intervals at which the intermittent means is set to operate.

Intermittent supply is accomplished via means 31 shown enclosed in broken lines in FIG. 2, whereas omission of such intermittent means provides continuous supply. In the former event, setting of the timing valve 33 regulates the flow of actuating fluid from the pressure container 11 into accumulator tank 34 until the switching pressure of pneumatic relay 35 is reached, whereupon the accumulated fluid is released through the relay to the valve mechanism. If either valve ball is unseated when the released fluid arrives the airmotor will be actuated in the appropriate direction of rotation. If not, no rotation will ensure, and the drop in pressure into the valve assembly permits the relay to reset and begin accumulating again. In the closed or accumulating position of the relay, vent 36 is open, returning the valve assembly to atmospheric pressure. A suitable pneumatic relay of this type is described and illustrated (FIG. 5) in U.S. Pat. No. 3,720,108. The repetition frequency, which is controlled by timing valve 33, may be set longer when less change in liquid flow is expected and shorter for periods of more frequent change, either manually or automatically as by clock control for diurnal variations. Fluid consumption will be greater the more frequently the relay is actuated, of course. Continuous, instead of intermittent, supply of actuating fluid to the valve assembly can be provided simply by omitting intermittent means 31 from main supply line 15 or by bypassing it.

Actuation of a recorder chart drive, if desired, may be by conventional spring motor (not shown). The present invention provides a simpler more convenient means and method of actuating the rest of the flow monitoring apparatus, namely, pneumatically. This is especially convenient when differential pressure sensing of liquid depth is being employed, whether using a bubbler tube as shown or a flexible membrane (not shown) in the bed of the channel. One effect of the invention is to provide force amplification of the expansion (or contraction) of the sensing bellows sufficient to actuate the flow indicator through rotation of the flow-characterizing cam and to rebalance the apparatus when adequate indication has occurred.

Although the description and illustration herein has focused upon a specific embodiment and disclosed variants thereof, other modifications may be made therein, as by adding, combining, and subdividing parts or steps, or by substituting equivalents thereof. Thus, more sophisticated (e.g., fluidic) like acting valve apparatus may replace the relatively simpler mechanism here disclosed, while retaining advantages and benefits of the present invention, which itself is defined in the following claims.

The claimed invention:

1. Flow monitoring apparatus for use in an open channel, comprising means adapted to be positioned adjacent the bed of the channel for pneumatically sensing pressure of overlying liquid as depth thereof, means for characterizing depth as flow of liquid, means for recording liquid flow, and pneumatically actuated means for transmitting changes in sensed depth from the sensing means to the flow characterizing means and including means for accumulating gradually increasing pneumatic pressure and means for releasing such accumulated pressure intermittently to actuate the flow characterizing means.

2. Flow monitoring apparatus according to claim 1, wherein the releasing means comprises a pneumatic relay and the accumulating means comprises a ballast tank interconnected to the upstream side of the relay.

3. Flow monitoring method according to claim 1, wherein pneumatic energization of the transmitting means is intermittent at a given repetition frequency.

4. Flow monitoring method according to claim 3, including the steps of reducing the repetition frequency during periods of relatively small changes in the sensed pressure and increasing the repetition frequency during periods of relatively large changes in the sensed pressure.

5. Flow monitoring method according to claim 3, including the step of adjusting the repetition frequency.

6. Apparatus for monitoring flow of liquid in an open channel, comprising pneumatic means adjacent the bed of the channel for sensing the pressure imposed by the overlying liquid, an expansible and contractable bellows operatively interconnected to the sensing means to respond to the sensed pressure, a cam having a surface configured as a mechanical analog to a given relationship of flow to depth of liquid, a cam follower contiguous with the cam surface, flow recording means connected to the cam follower to provide an indication of the flow, and pneumatically actuated transmitting means interposed between and interconnecting the bellows exterior to the cam to move the cam surface relative to the follower upon expansion and contraction of the bellows wherein the transmitting means includes a position sensor adjacent the bellows to sense the expansion and contraction thereof, a position controller interconnected to the cam to vary its position in accordance with the expansion and contraction of the bellows, and pneumatically driven motor means interposed between and interconnecting the position sensor and the position controller wherein the sensor comprises reversing valve means adapted to receive pneumatic fluid from a supply thereof and interconnected to drive the motor means thereof and interconnected to drive the motor means therewith, the direction of motor rotation being determined by the position relationship between the valve means and the bellows exterior including linkage between the motor means and the valve means to restore the position relationship between the sensor means and the bellows to a relative position in which the bellows closes the valve means to preclude movement of the cam in either direction when the cam is positioned in accordance with the sensed pressure and the resulting flow-to-depth valve.

7. Flow monitoring apparatus according to claim 6, including reversing valve means interposed between the motor and a supply of air under pressure and adjacent to and operated by the sensing means to reposition the flow-recording element appropriately upon movement of the sensing means.

8. Flow monitoring apparatus according to claim 7, including linkage between the air motor and the valve means to reposition the valve means to close off the supply of air to the motor when the movement of the sensing means has been recorded by the flow recording element.

9. In apparatus for monitoring flow of liquid in a given open channel, including flow-indicating means having a movable indicator of flow amplitude, the combination of pneumatic means adjacent the bed of the channel for sensing liquid depth in terms of the pressure imposed by the overlying liquid, movable flow-characterizing means configured in accordance with a known relationship between liquid depth and flow in the given channel and interconnected to the flow indicator to move the same upon movement of the flow-characterizing means, movable pressure-responsive means interconnected to the sensing means to be displaced proportionately upon occurrence of change in sensed pressure, and pneumatically actuated means for transmitting such displacement of the pressure-responsive means to the flow-characterizing means to move it accordingly wherein the flow-characterizing means comprises a mechanical depth-to-flow cam and a follower movable by the cam surface in accordance with flow when the cam is rotated in accordance with depth of the liquid in the channel wherein the transmitting means comprises reversing valve means adjacent the pressure-responsive means and responsive to proportional displacement thereof to rotate the cam in one direction upon such displacement in response to decrease in sensed pressure and to rotate the cam in the opposite direction upon contrary displacement in response to increase in the sensed pressure, and wherein the reversing valve means comprises a pair of valve-opening levers located for displacement oppositely to open position by opposite displacements of the pressure-responsive means, each such lever being displaceable oppositely to closed position by displacement of the valve means as a whole.

10. In apparatus for monitoring flow of liquid in a given open channel, including flow-indicating means having a movable indicator of flow amplitude, the combination of pneumatic means adjacent the bed of the channel for sensing liquid depth in terms of the pressure imposed by the overlying liquid, movable flow-characterizing means configured in accordance with a known relationship between liquid depth and flow in the given channel and interconnected to the flow indicator to move the same upon movement of the flow-characterizing means, movable pressure-responsive means interconnected to the sensing means to be dispaced proportionately upon occurrence of change in sensed pressure, and pneumatically actuated means for transmitting such displacement of the pressure-responsive means to the flow-characterizing means to move it accordingly, wherein the flow-characterizing means comprises a mechanical depth-to-flow cam and a follower movable by the cam surface in accordance with flow when the cam is rotated in accordance with depth of the liquid in the channel, wherein the transmitting means comprises reversing valve means adjacent the pressure-responsive means and responsive to proportional displacement thereof to rotate the cam in one direction upon such displacement in response to decrease in sensed pressure and to rotate the cam in the opposite direction upon contrary displacement in response to increase in the sensed pressure, wherein the transmitting means is linked to the reversing valve means to displace the same in accordance with movement of the cam to place the valve means in an intermediate null position relative to the pressure-responsive means and thereby terminate repositioning movement of the transmitting means, and wherein the transmitting means comprises a second cam and a cam follower therefor in the linkage to the reversing valve means to regulate displacement of the valve means upon rotation thereof in conjunction with rotation of the first cam.

* * * * *